(12) United States Patent
Sarkar et al.

(10) Patent No.: US 8,014,265 B2
(45) Date of Patent: Sep. 6, 2011

(54) EIGEN-BEAMFORMING FOR WIRELESS COMMUNICATION SYSTEMS

(75) Inventors: Sandip Sarkar, San Diego, CA (US); Byoung-Hoon Kim, Seoul (KR); Durga Prasad Malladi, San Diego, CA (US); Juan Montojo, San Diego, CA (US)

(73) Assignee: QUALCOMM incorporated, San Diego, CA (US)

( * ) Notice: Subject to any disclaimer, the term of this patent is extended or adjusted under 35 U.S.C. 154(b) by 86 days.

(21) Appl. No.: 12/189,483

(22) Filed: Aug. 11, 2008

(65) Prior Publication Data

US 2009/0046570 A1 Feb. 19, 2009

Related U.S. Application Data

(60) Provisional application No. 60/956,106, filed on Aug. 15, 2007.

(51) Int. Cl.
*H04W 4/00* (2009.01)
(52) U.S. Cl. ......... 370/203; 370/334; 455/101; 455/133
(58) Field of Classification Search ........................ None
See application file for complete search history.

(56) References Cited

U.S. PATENT DOCUMENTS

| 2004/0042428 | A1 | 3/2004 | Hamalainen et al. | 370/335 |
|---|---|---|---|---|
| 2004/0062211 | A1 | 4/2004 | Uhlik | 370/278 |
| 2004/0085939 | A1 | 5/2004 | Wallace et al. | 370/335 |
| 2005/0128965 | A1 | 6/2005 | Seo et al. | 370/310 |
| 2005/0201486 | A1 | 9/2005 | Han et al. | 375/295 |
| 2007/0005749 | A1 | 1/2007 | Sampath | 709/223 |
| 2007/0086540 | A1 | 4/2007 | Chae et al. | 375/267 |
| 2007/0087749 | A1* | 4/2007 | Ionescu et al. | 455/436 |
| 2007/0097856 | A1 | 5/2007 | Wang et al. | 320/210 |

(Continued)

FOREIGN PATENT DOCUMENTS

EP 1562306 A1 8/2005

(Continued)

OTHER PUBLICATIONS

3GPP TS 36.211, "3rd Generation Partnership Project: Technical Specification Group Radio Access Network; Physical Channels and Modulation (Release 8)", Jun. 2007, sections 4, 5.4, 5.8, 5.9 and 6.5, v1.2.0, 3GPP, Valbonne, France.

(Continued)

*Primary Examiner* — Chi H. Pham
*Assistant Examiner* — Shick Hom
(74) *Attorney, Agent, or Firm* — Peng Zhu; Kenyon S. Jenckes

(57) ABSTRACT

Techniques for sending multiple-input multiple-output (MIMO) transmissions in wireless communication systems are described. In one design, a transmitter sends a first reference signal via a first link, e.g., a cell-specific reference signal via the downlink. The transmitter receives channel quality indicator (CQI) information determined by a receiver based on the first reference signal. The transmitter also receives a second reference signal from the receiver via a second link, e.g., a sounding reference signal via the uplink. The transmitter obtains at least one MIMO channel matrix for the first link based on the second reference signal. The transmitter determines at least one precoding matrix based on the at least one MIMO channel matrix, e.g., in accordance with ideal eigen-beamforming or pseudo eigen-beamforming. The transmitter then sends a data transmission to the receiver based on the at least one precoding matrix and the CQI information.

22 Claims, 8 Drawing Sheets

U.S. PATENT DOCUMENTS

| | | | |
|---|---|---|---|
| 2007/0099578 A1 | 5/2007 | Adeney et al. | 455/69 |
| 2007/0160156 A1 | 7/2007 | Melzer et al. | 375/260 |
| 2007/0160162 A1 | 7/2007 | Kim et al. | 375/267 |
| 2007/0291868 A1* | 12/2007 | Olesen et al. | 375/267 |
| 2008/0225960 A1* | 9/2008 | Kotecha et al. | 375/259 |
| 2008/0227495 A1* | 9/2008 | Kotecha et al. | 455/562.1 |
| 2008/0310353 A1 | 12/2008 | Love et al. | 370/329 |

FOREIGN PATENT DOCUMENTS

| | | |
|---|---|---|
| KR | 20050058030 A | 6/2005 |
| KR | 20070042099 A | 4/2007 |
| WO | WO0143309 A2 | 6/2001 |
| WO | WO0176110 A2 | 10/2001 |
| WO | WO2006130865 | 12/2006 |
| WO | WO2008103313 | 8/2008 |

OTHER PUBLICATIONS

Hemanth Sampath: "Linear Preceding and Decoding for Multiple Input Multiple Output (MIMO) Wireless Channels" PHD DISSERTATION, Apr. 1, 2001, pp. 1-157, XP002245817 Stanford university the whole document.

International Search Report and the Written Opinion—PCT/US2008/073386 International Search Authority—European Patent Office—Dec. 16, 2008.

* cited by examiner

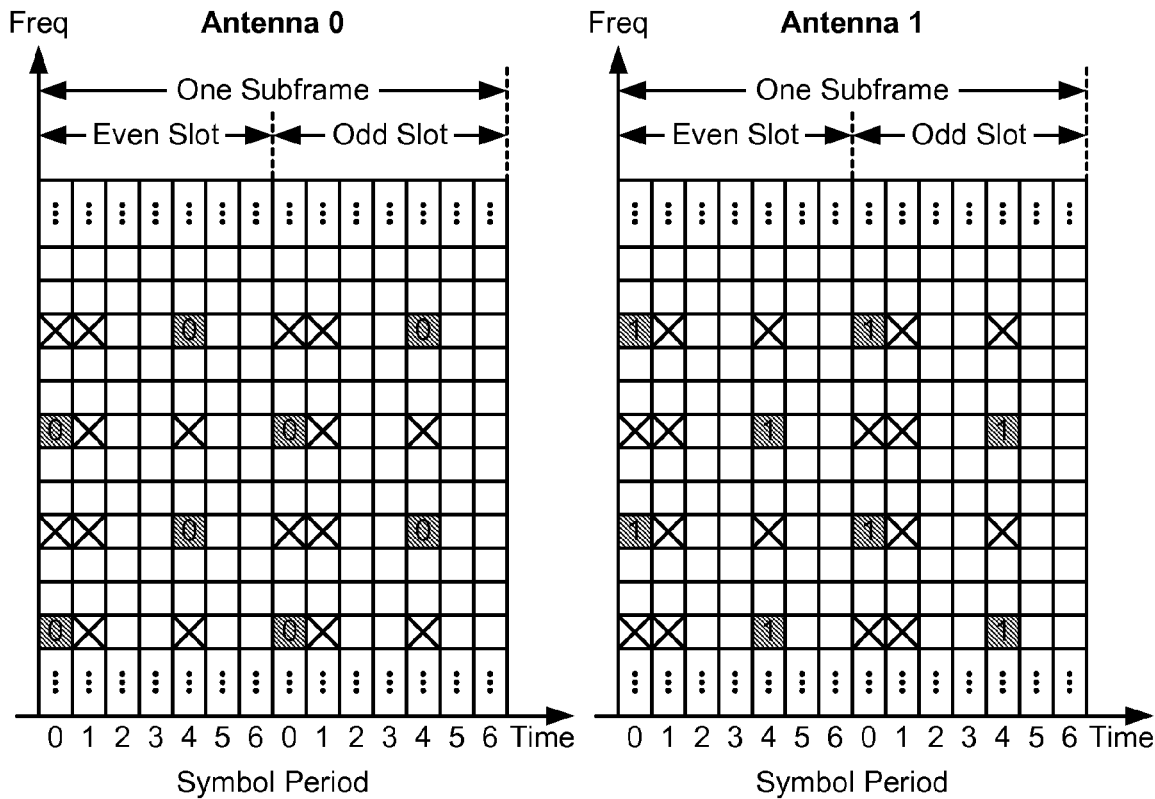
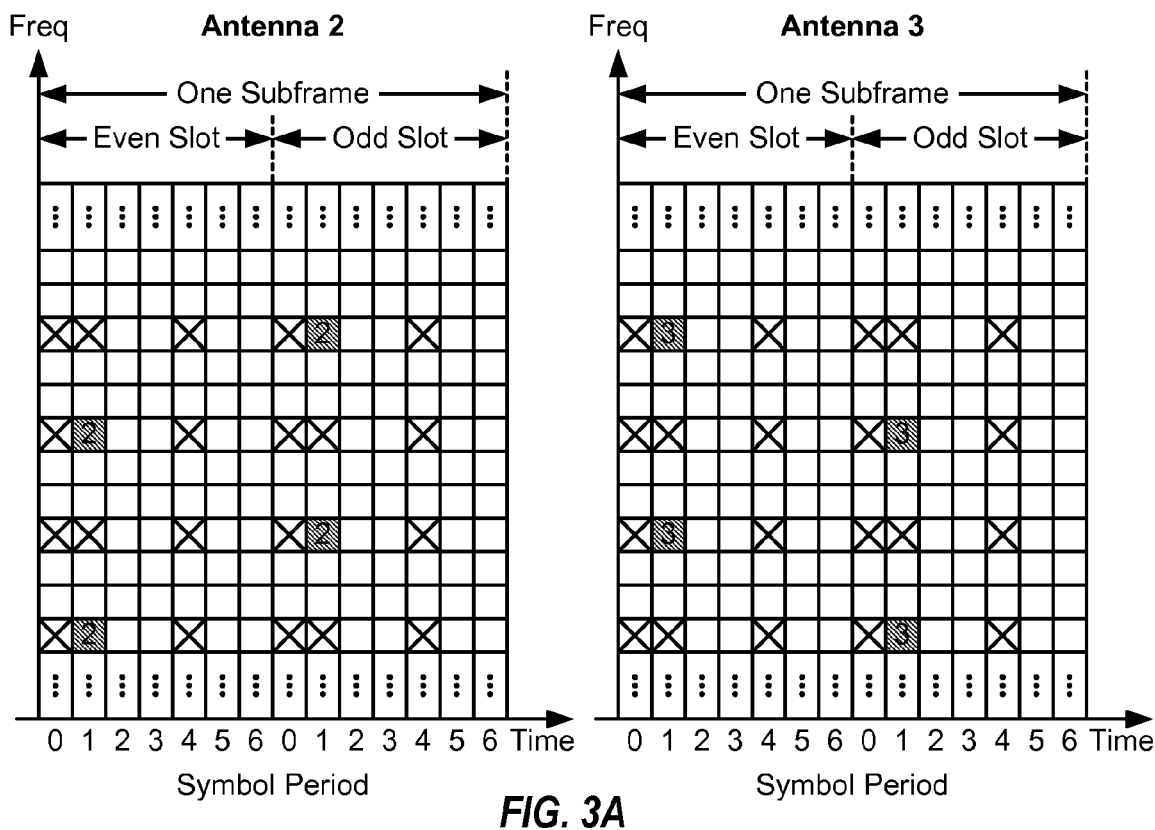
FIG. 3A

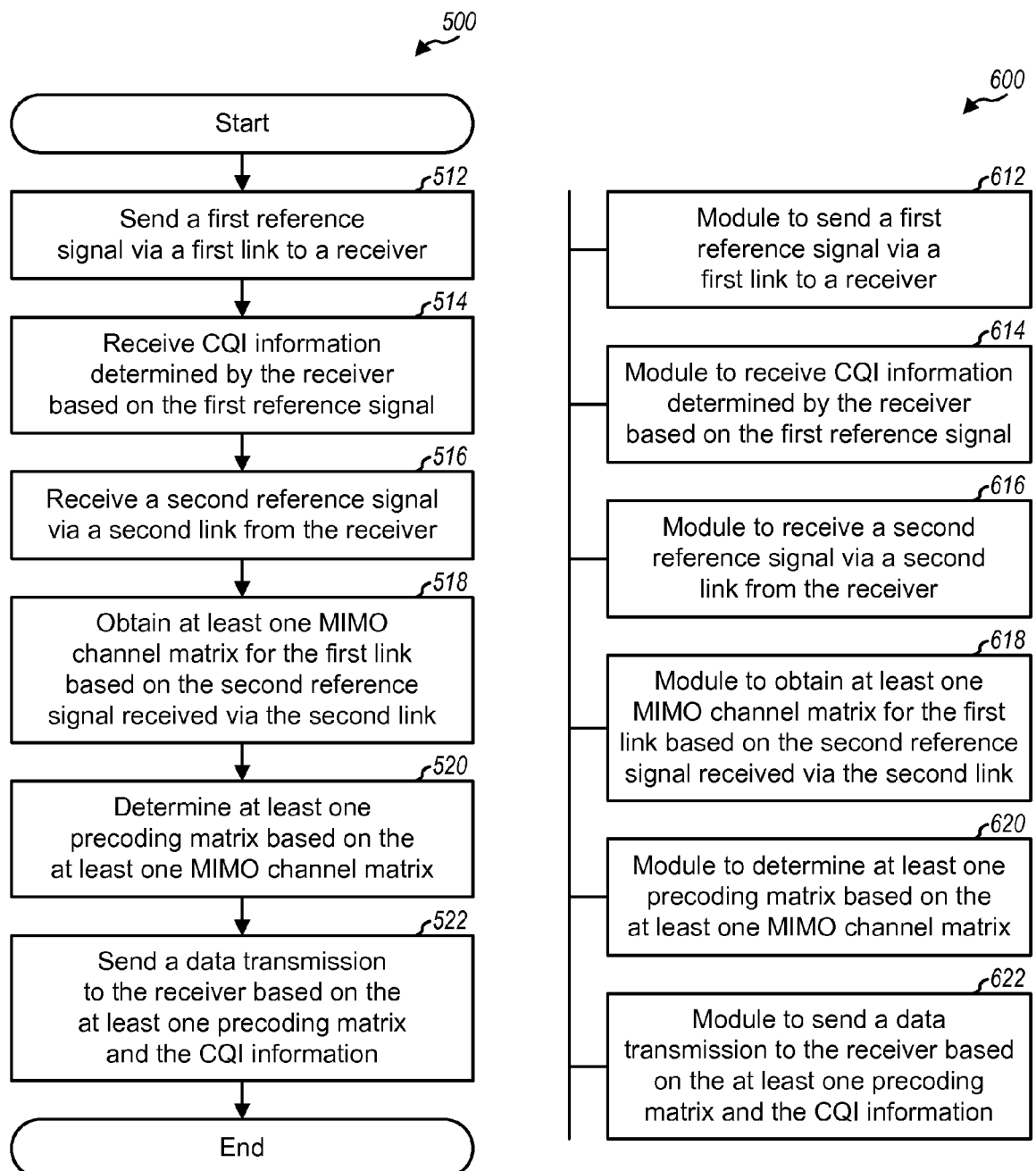

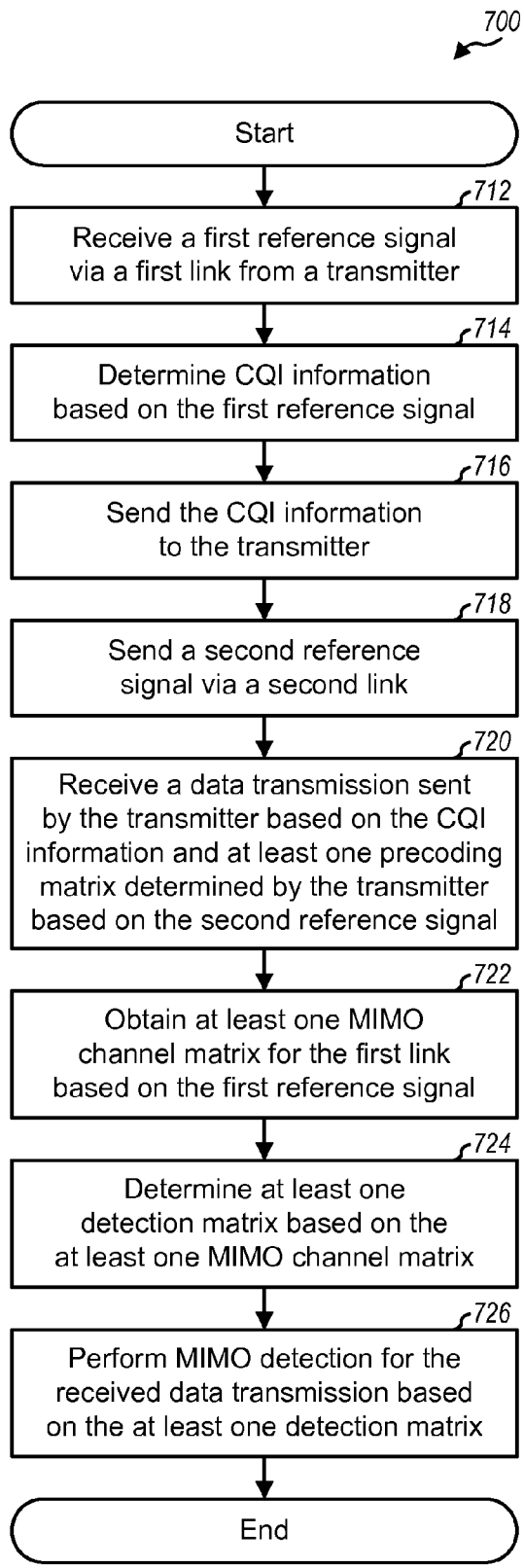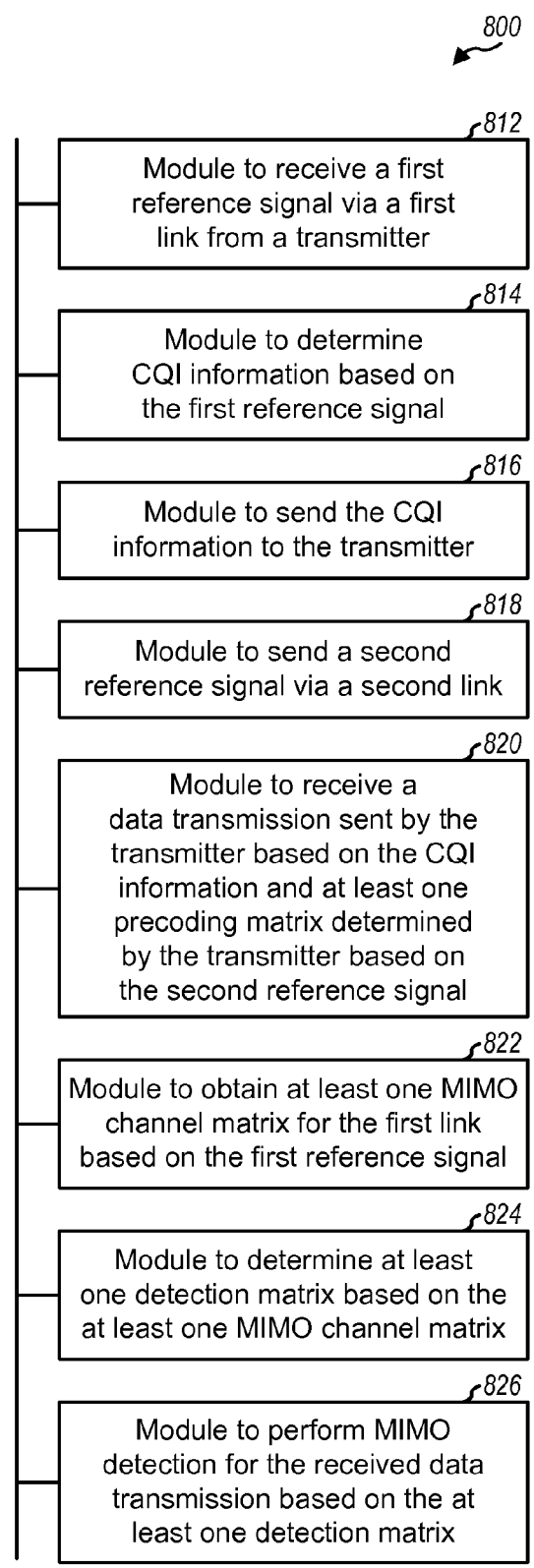
FIG. 7
FIG. 8

EIGEN-BEAMFORMING FOR WIRELESS COMMUNICATION SYSTEMS

The present application claims priority to provisional U.S. Application Ser. No. 60/956,106, entitled "BEAMFORMING FOR TDD IN LTE," filed Aug. 15, 2007, assigned to the assignee hereof and incorporated herein by reference.

BACKGROUND

I. Field

The present disclosure relates generally to communication, and more specifically to techniques for transmitting data in a wireless communication system.

II. Background

In a wireless communication system, a transmitter may utilize multiple (T) transmit antennas for data transmission to a receiver equipped with multiple (R) receive antennas. The multiple transmit and receive antennas form a multiple-input multiple-output (MIMO) channel that may be used to increase throughput and/or improve reliability. For example, the transmitter may transmit up to T symbol streams simultaneously from the T transmit antennas to improve throughput. Alternatively, the transmitter may transmit a single symbol stream from all T transmit antennas to improve reception by the receiver. In any case, it is desirable to transmit data in a manner to achieve good performance.

SUMMARY

Techniques for sending MIMO transmission in wireless communication systems are described herein. The techniques may be used for frequency division duplexed (FDD) and time division duplexed (TDD) systems.

In one design, a transmitter may send a first reference signal via a first link. The transmitter may be a Node B for data transmission on the downlink or a user equipment (UE) for data transmission on the uplink. The transmitter may receive channel quality indicator (CQI) information determined by a receiver based on the first reference signal. The transmitter may also receive a second reference signal via a second link from the receiver. The transmitter may obtain at least one MIMO channel matrix for the first link based on the second reference signal received via the second link. The transmitter may determine at least one preceding matrix based on the at least one MIMO channel matrix. The transmitter may then send a data transmission to the receiver based on the at least one preceding matrix and the CQI information.

In one design, the transmitter may perform singular value decomposition of the at least one MIMO channel matrix to obtain at least one matrix of eigenvectors. The transmitter may then determine the at least one preceding matrix based on the at least one matrix of eigenvectors. In another design, the transmitter may form at least one pseudo-beam matrix based on the at least one MIMO channel matrix. The transmitter may perform QR decomposition of the at least one pseudo-beam matrix to obtain at least one matrix of orthogonal vectors. The transmitter may then determine the at least one precoding matrix based on the at least one matrix of orthogonal vectors.

For data transmission on the downlink, the first reference signal may be a cell-specific reference signal sent by a Node B on the downlink, and the second reference signal may be a sounding reference signal sent by a UE on the uplink. For data transmission on the uplink, the first reference signal may be a sounding reference signal sent by a UE on the uplink, and the second reference signal may be a cell-specific reference signal sent by a Node B on the downlink. A reference signal is a signal that is known a priori by both a transmitter and a receiver. A reference signal may also be referred to as pilot, preamble, sounding, etc.

Various aspects and features of the disclosure are described in further detail below.

BRIEF DESCRIPTION OF THE DRAWINGS

FIG. 3A shows a cell-specific reference signal sent by a Node B.

FIG. 5 shows a process for sending a MIMO transmission.

FIG. 6 shows an apparatus for sending a MIMO transmission.

FIG. 7 shows a process for receiving a MIMO transmission.

FIG. 8 shows an apparatus for receiving a MIMO transmission.

DETAILED DESCRIPTION

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for data transmission in LTE, and LTE terminology is used in much of the description below.

Figure 1:
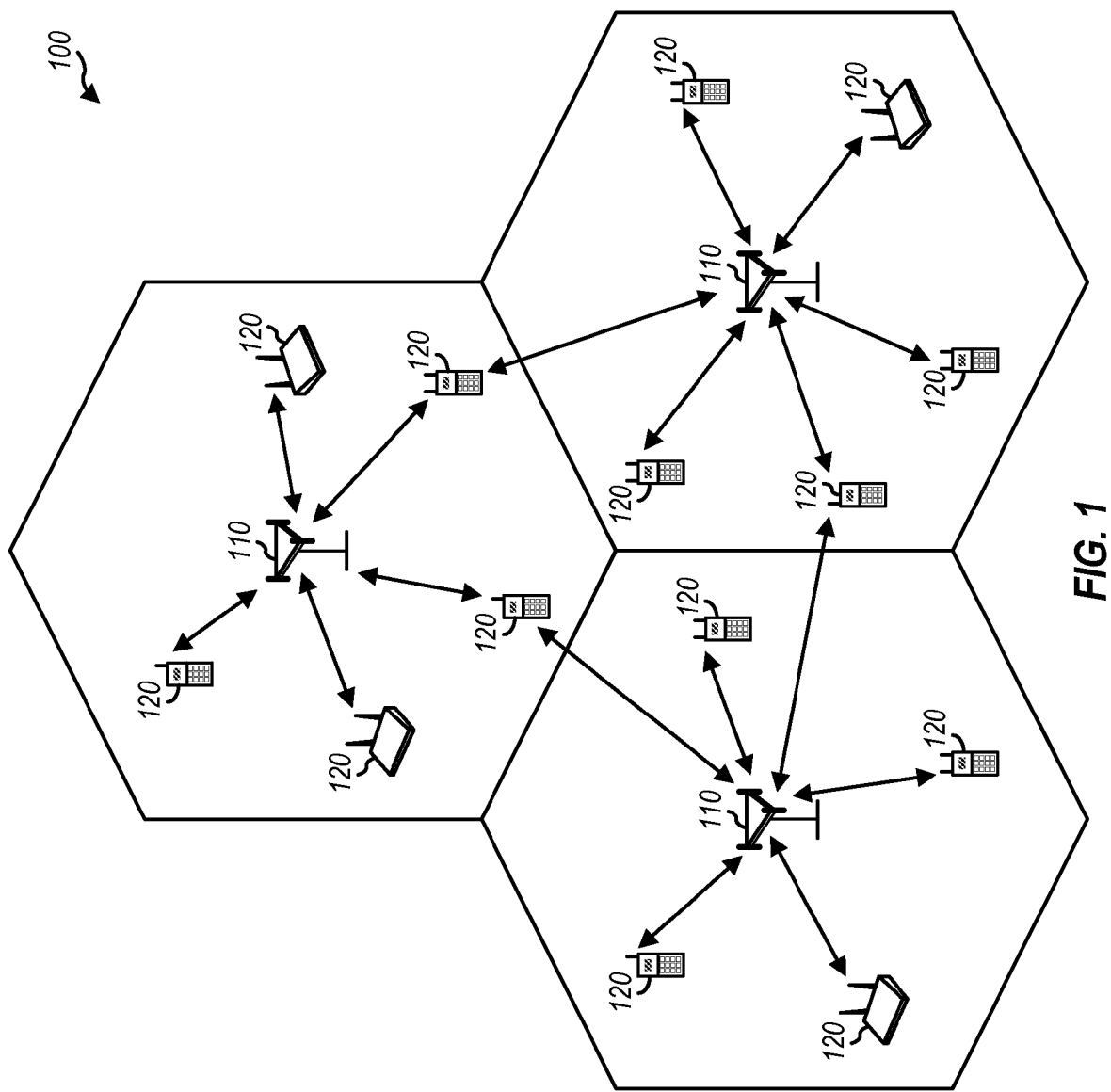
FIG. 1 shows a wireless communication system.

FIG. 1 shows a wireless communication system 100, which may be an LTE system. System 100 may include a number of Node Bs 110 and other network entities. A Node B may be a fixed station that communicates with the UEs and may also be referred to as an evolved Node B (eNB), a base station, an access point, etc. Each Node B 110 provides communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area. In 3GPP2, the term "sector" can refer to the smallest coverage area of a base station and/or a base station subsystem serving this coverage area. For clarity, 3GPP concept of cell is used in the description below.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

The K total subcarriers may be grouped into resource blocks. Each resource block may include N subcarriers (e.g., N=12 subcarriers) in one slot. The available resource blocks may be assigned to UEs for transmission of traffic data and control information. The K total subcarriers may also be partitioned into subbands. Each subband may include 72 subcarriers in 6 resource blocks and may cover 1.08 MHz.

The system may utilize FDD or TDD. For FDD, the downlink and uplink may be allocated separate frequency channels, and the channel response for the downlink may be uncorrelated with the channel response for the uplink. For TDD, the downlink and uplink may share the same frequency channel, and the downlink channel response may be correlated with the uplink channel response.

Figure 2A:
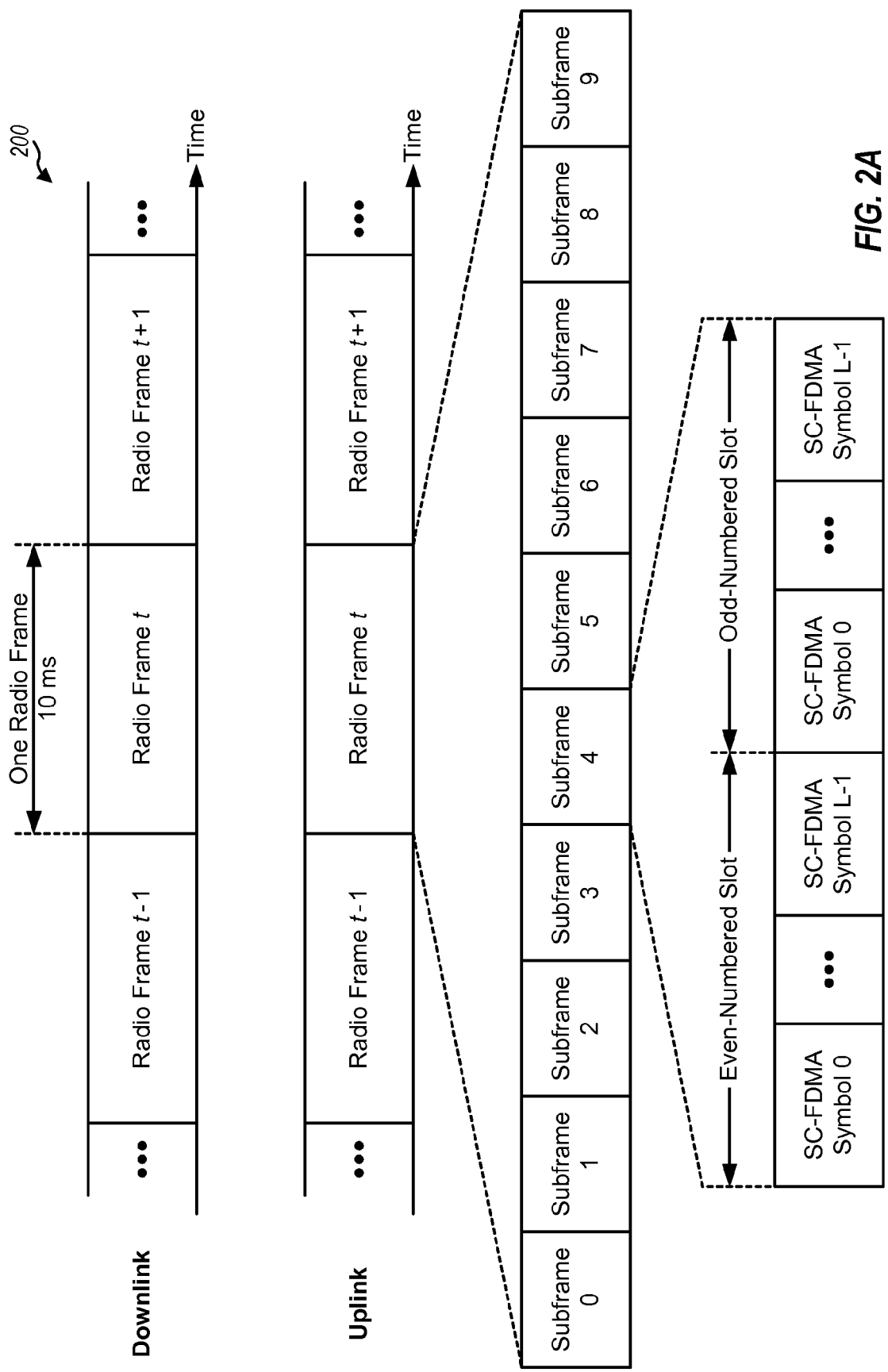
FIG. 2A shows an example frame structure for FDD.

FIG. 2A shows an example frame structure 200 of a frame structure type 1 (FS1), which may be used for FDD in LTE. The transmission timeline for each link may be partitioned into units of radio frames. Each radio frame may have a predetermined duration (e.g., 10 milliseconds (ms)) and may be partitioned into 10 subframes with indices of 0 through 9. Each subframe may include two slots, and each slot may include L symbol periods, e.g., L=6 symbol periods for an extended cyclic prefix or L=7 symbol periods for a normal cyclic prefix.

For FDD, 10 subframes may be available for downlink transmission and 10 subframes may be available for uplink transmission in each radio frame. The downlink and uplink transmissions are separated in the frequency domain.

Figure 2B:
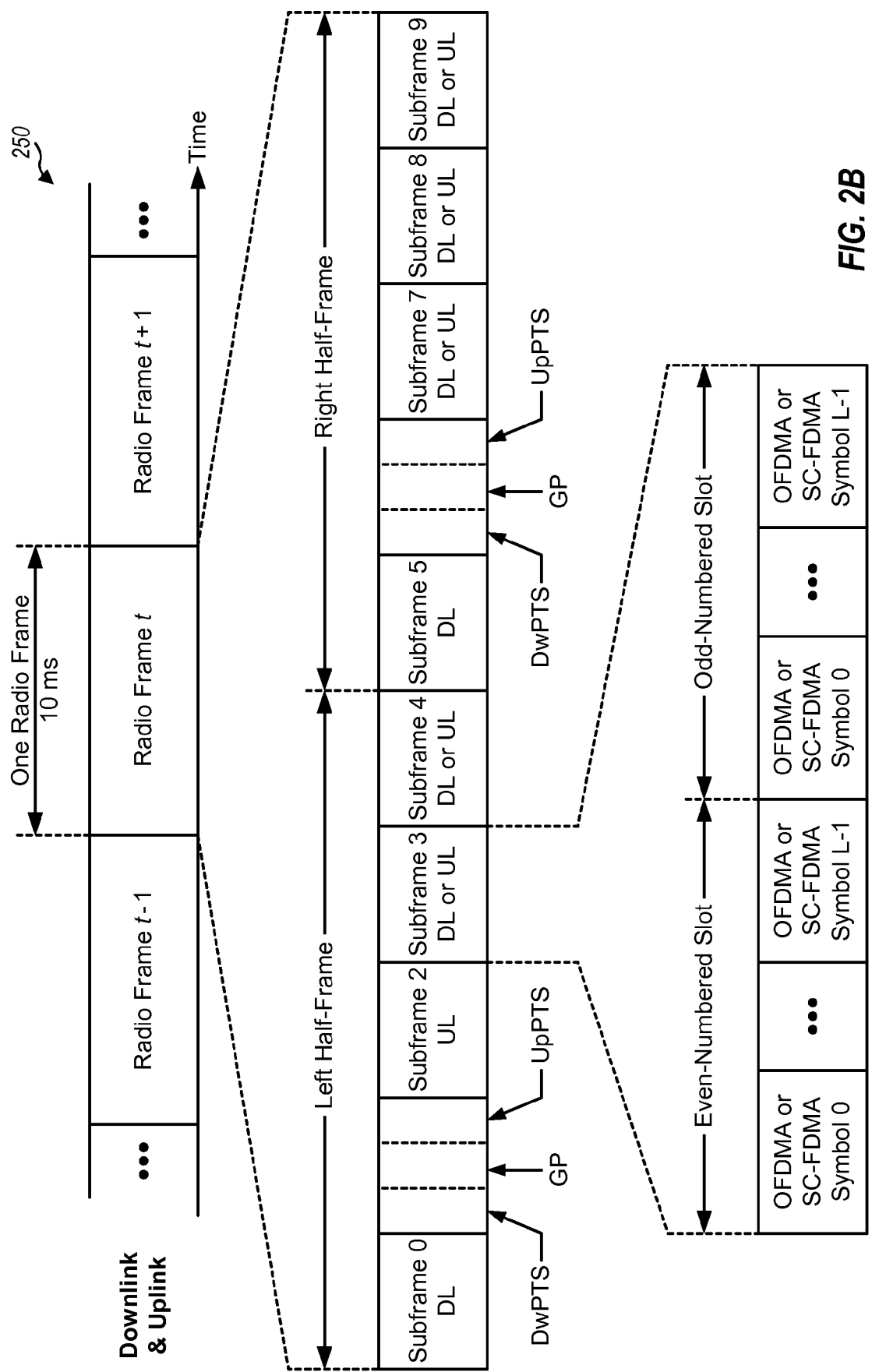
FIG. 2B shows an example frame structure for TDD.

FIG. 2B shows an example frame structure 250 of a frame structure type 2 (FS2), which may be used for TDD in LTE. The transmission timeline may be partitioned into units of radio frames. Each radio frame may have a duration of 10 ms and may be partitioned into 10 subframes with indices of 0 through 9. LTE supports multiple downlink-uplink configurations. Subframes 0 and 5 may be used for the downlink (DL) and subframe 2 may be used for the uplink (UL) for all downlink-uplink configurations. Subframes 3, 4, 7, 8 and 9 may each be used for the either downlink or uplink depending on the downlink-uplink configuration. Subframe 1 may include three special fields composed of a downlink pilot time slot (DwPTS) for data, control and synchronization signals, a guard period (GP) of no transmission, and an uplink pilot time slot (UpPTS) for sounding reference signals and a random access channel (RACH). Subframe 6 may include only the DwPTS, or all three special fields, or a downlink subframe depending on the downlink-uplink configuration. The DwPTS, GP and UpPTS may have different durations for different subframe configurations. Each subframe that is not used for the special fields may be partitioned into two slots, and each slot may include L symbol periods.

Frame structures 200 and 250 are described in 3GPP TS 36.211, entitled "Evolved Universal Terrestrial Radio Access (E-UTRA); Physical Channels and Modulation," which is publicly available.

The system may support various reference signals for the downlink and uplink. A reference signal may be used by a receiver for various purposes such as channel estimation, coherent demodulation, channel quality measurement, signal strength measurement, etc. Table 1 lists some reference signals that may be transmitted on the downlink and uplink and provides a short description for each reference signal. A cell-specific reference signal may also be referred to as a common pilot, a broadband pilot, etc.

TABLE 1

| Link | Reference Signal | Description |
|---|---|---|
| Downlink | Cell-specific reference signal | Reference signal sent by a Node B and used by the UEs for channel estimation and channel quality measurement. |
| Uplink | Sounding reference signal | Reference signal sent by a UE and used by a Node B for channel estimation and channel quality measurement. |

The reference signals may be generated in various manners. In one design, a cell-specific reference signal sequence may be generated based on a pseudo-random sequence, as follows:

$$r_{csrs}(n) = \frac{1}{\sqrt{2}} \cdot [1 - 2 \cdot c(2n)] + j\frac{1}{\sqrt{2}}[1 - 2 \cdot c(2n+1)], \quad \text{Eq (1)}$$

where c(n) is a pseudo-random sequence, and
$r_{csrs}(n)$ is a cell-specific reference signal sequence.

The pseudo-random sequence c(n) may be generated with a linear feedback shift register (LFSR), which may be initialized to a value determined based on a cell identity (ID). In the design shown in equation (1), the cell-specific reference signal sequence $r_{csrs}(n)$ is composed of complex-valued symbols, with each complex-valued symbol being defined by two consecutive symbols of the pseudo-random sequence. Sequence $r_{csrs}(n)$ may be used to generate the cell-specific reference signal.

A sounding reference signal may be generated based on a constant amplitude zero auto correlation (CAZAC) sequence having good correlation properties. In one design, the CAZAC sequence is a Zardoff-Chu sequence that may be expressed as:

$$x_q(n) = e^{-j\pi \cdot q \cdot n \cdot (n+1)/L}, \quad \text{Eq (2)}$$

where q is the root and L is the length of the Zardoff-Chu sequence, and
$x_q(n)$ is the q-th root Zardoff-Chu sequence.

L may be the largest prime number less than the desired length of a sounding reference signal sequence. The Zardoff- Chu sequence may be repeated as needed to obtain a base sequence $r_b(n)$ of the desired length, as follows:

$$r_b(n) = x_q(n \bmod L). \qquad \text{Eq (3)}$$

In another design, a base sequence may be defined as follows:

$$r_b(n) = e^{j\phi(n)\cdot\pi/4}, \qquad \text{Eq (4)}$$

where $\phi(n)$ is a set of phases defined to obtain a CAZAC sequence.

For both designs above, the sounding reference signal sequence $r_{srs}(n)$ may be obtained by cyclically shifting the base sequence $r_b(n)$, as follows:

$$r_{srs}(n) = e^{j\alpha\cdot n} \cdot r_b(n), \qquad \text{Eq (5)}$$

where $\alpha$ is a cyclic shift assigned to the UE. Sequence $r_{srs}(n)$ may be used to generate the sounding reference signal.

A Node B may also send a UE-specific reference signal to a UE. Generation of the cell-specific reference signal, the sounding reference signal, and other reference signals in LTE is described in the aforementioned 3GPP TS 36.211.

FIG. 3A shows example transmission of a cell-specific reference signal from four antennas 0 through 3 for one cell. In LTE, each slot includes seven symbol periods 0 through 6 for a normal cyclic prefix. The cell-specific reference signal may be transmitted from antennas 0 and 1 in symbol periods 0 and 4 of each slot and from antennas 2 and 3 in symbol period 1 of each slot.

The cell-specific reference signal may be transmitted from a given antenna on subcarriers that are spaced apart by six subcarriers in each symbol period in which the reference signal is transmitted. Furthermore, no other signals may be transmitted by the cell on the subcarriers used for the cell-specific reference signal in order to avoid interference to the cell-specific reference signal. As shown in FIG. 3A, the cell-specific reference signal may be transmitted from antenna 0 on a first set of subcarriers in symbol period 0 and on a second set of subcarriers in symbol period 4 of each slot. The subcarriers in the second set may be offset from the subcarriers in the first set by three subcarriers. The cell-specific reference signal may be transmitted from antenna 1 on the second set of subcarriers in symbol period 0 and on the first set of subcarriers in symbol period 4 of each slot. The cell-specific reference signal may be transmitted from antenna 2 on the first set of subcarriers in symbol period 1 of each even-numbered slot and on the second set of subcarriers in symbol period 1 of each odd-numbered slot. The cell-specific reference signal may be transmitted from antenna 3 on the second set of subcarriers in symbol period 1 of each even-numbered slot and on the first set of subcarriers in symbol period 1 of each odd-numbered slot.

Figure 3B:
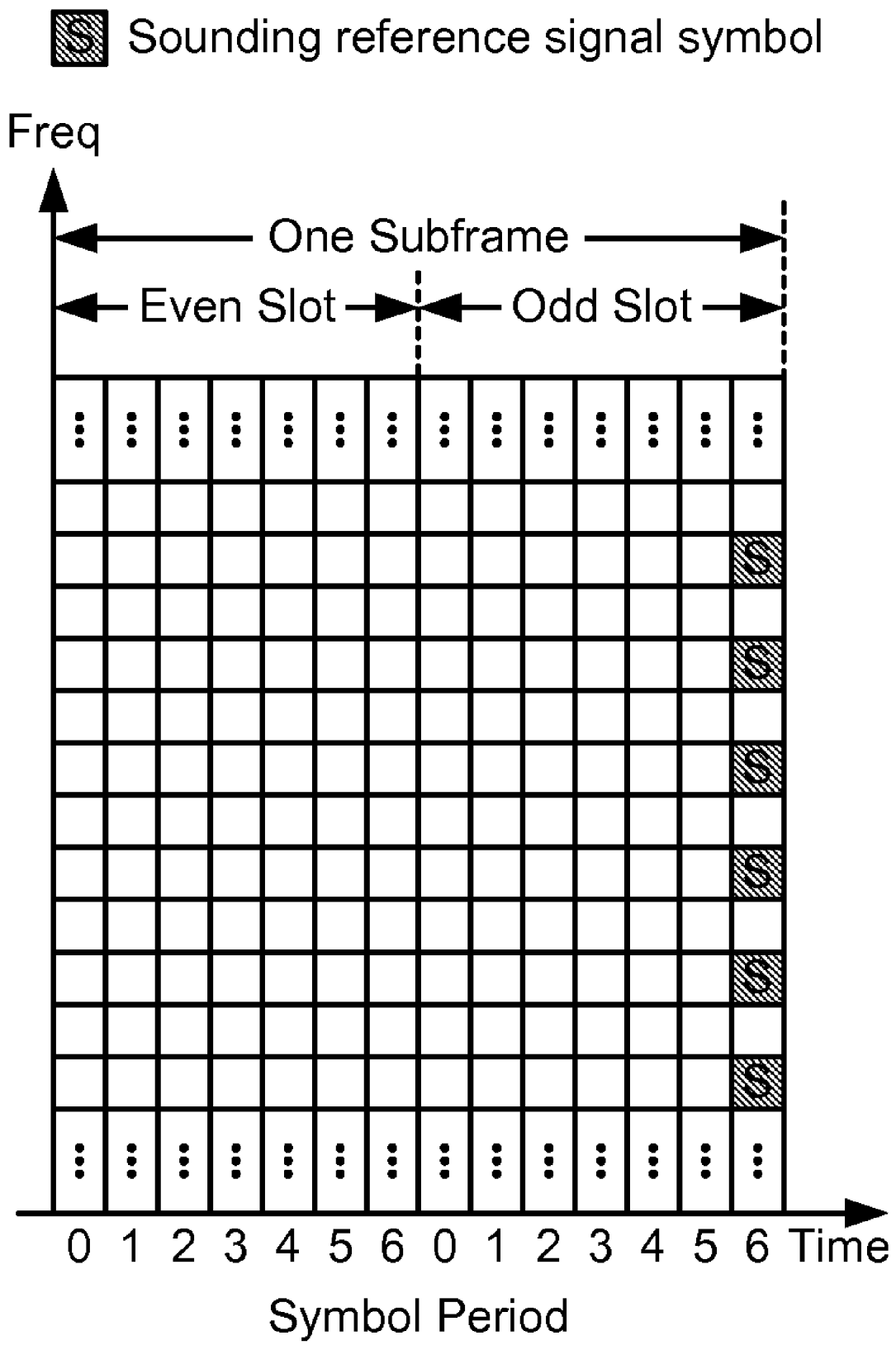
FIG. 3B shows a sounding reference signal sent by a UE.

FIG. 3B shows example transmission of a sounding reference signal on the uplink. The sounding reference signal may be transmitted on every other subcarrier in a set of subcarriers that may cover a single subband, multiple subbands, or the entire system bandwidth. The sounding reference signal may be transmitted in the last symbol period of a subframe. The sounding reference signal may be transmitted on different subbands in different subframes, e.g., by cycling through the subbands and transmitting the sounding reference signal on a different subband in each subframe in which the sounding reference signal is transmitted. The sounding reference signal may also be transmitted from different antennas at a UE in different subframes, e.g., by cycling through the antennas and transmitting the sounding reference signal from a different antenna in each subframe in which the sounding reference signal is transmitted.

Transmission of the cell-specific reference signal and the sounding reference signal is described in the aforementioned 3GPP TS 36.211.

Figure 4:
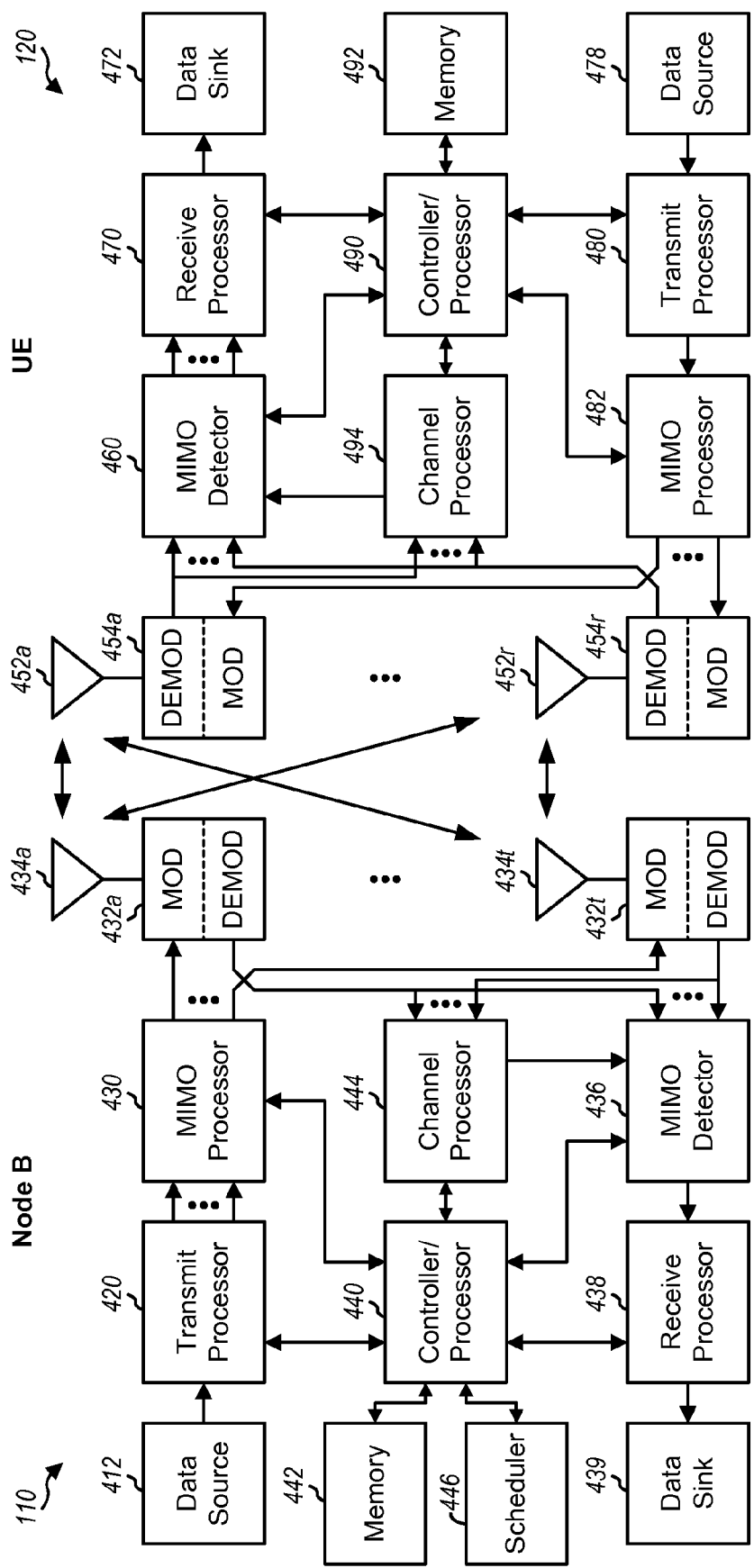
FIG. 4 shows a block diagram of a Node B and a UE.

FIG. 4 shows a block diagram of a design of a Node B 110 and a UE 120, which may be one of the Node Bs and one of the UEs in FIG. 1. Node B 110 is equipped with multiple (T) antennas 434a through 434t. UE 120 is equipped with multiple (R) antennas 452a through 452r. Much of the description below assumes that each antenna may be used for data transmission and reception.

At Node B 110, a transmit processor 420 may receive traffic data for one or more UEs from a data source 412, process (e.g., encode and modulate) the traffic data for each UE based on one or more modulation and coding schemes (MCSs) for that UE, and provide data symbols for all UEs. Transmit processor 420 may also generate control symbols for control information/signaling. Transmit processor 420 may further generate reference symbols for one or more reference signals, e.g., a cell-specific reference signal. A MIMO processor 430 may perform precoding for the data symbols, the control symbols, and the reference symbols as described below and may provide T output symbol streams to T modulators (MOD) 432a through 432t. Each modulator 432 may process its output symbol stream (e.g., for OFDM) to obtain an output sample stream. Each modulator 432 may further condition (e.g., convert to analog, filter, amplify, and upconvert) its output sample stream and generate a downlink signal. T downlink signals from modulators 432a through 432t may be transmitted via antennas 434a through 434t, respectively.

At UE 120, R antennas 452a through 452r may receive the T downlink signals from Node B 110, and each antenna 452 may provide a received signal to an associated demodulator (DEMOD) 454. Each demodulator 454 may condition (e.g., filter, amplify, downconvert, and digitize) its received signal to obtain samples and may further process the samples (e.g., for OFDM) to obtain received symbols. Each demodulator 454 may provide received data symbols and received control symbols to a MIMO detector 460 and may provide received reference symbols to a channel processor 494. Channel processor 494 may estimate the downlink MIMO channel from Node B 110 to UE 120 based on the received reference symbols and may provide a downlink MIMO channel estimate to MIMO detector 460. MIMO detector 460 may perform MIMO detection on the received data symbols and the received control symbols based on the downlink MIMO channel estimate and provide symbol estimates, which are estimates of the transmitted symbols. A receive processor 470 may process (e.g., demodulate and decode) the symbol estimates, provide decoded traffic data to a data sink 472, and provide decoded control information to a controller/processor 490.

UE 120 may estimate the downlink channel quality and generate feedback information, which may comprise various types of information described below. The feedback information, traffic data from a data source 478, and one or more reference signals (e.g., a sounding reference signal) may be processed (e.g., encoded and modulated) by a transmit processor 480, precoded by a MIMO processor 482, and further processed by modulators 454a through 454r to generate R uplink signals, which may be transmitted via antennas 452a through 452r. At Node B 110, the R uplink signals from UE 120 may be received by antennas 434a through 434t and processed by demodulators 432a through 432t. A channel processor 444 may estimate the uplink MIMO channel from UE 120 to Node B 110 and may provide an uplink MIMO channel estimate to MIMO detector 436. MIMO detector 436 may perform MIMO detection based on the uplink MIMO channel estimate and provide symbol estimates. A receive processor 438 may process the symbol estimates, provide decoded traffic data to a data sink 439, and provide decoded feedback information to a controller/processor 440. Controller/processor 440 may control data transmission to UE 120 based on the feedback information.

Controllers/processors 440 and 490 may direct the operation at Node B 110 and UE 120, respectively. Memories 442 and 492 may store data and program codes for Node B 110 and UE 120, respectively. A scheduler 446 may select UE 120 and/or other UEs for data transmission on the downlink and/or uplink based on the feedback information received from the UEs. Scheduler 446 may also allocate resources to the scheduled UEs.

The downlink MIMO channel formed by the T antennas at Node B 110 and the R antennas at UE 120 may be characterized by an R×T MIMO channel matrix $H_{DL}(k)$ for each subcarrier k. $H_{DL}(k)$ may be expressed as:

$$H_{DL}(k) = \begin{bmatrix} h_{1,1}(k) & h_{1,2}(k) & \ldots & h_{1,T}(k) \\ h_{2,1}(k) & h_{2,2}(k) & \ldots & h_{2,T}(k) \\ \vdots & \vdots & \ddots & \vdots \\ h_{R,1}(k) & h_{R,2}(k) & \ldots & h_{R,T}(k) \end{bmatrix}, \quad \text{Eq (6)}$$

where entry $h_{i,j}(k)$, for i=1, ..., R and j=1, ..., T, is a complex gain between Node B antenna j and UE antenna i for subcarrier k.

The uplink MIMO channel formed by the R antennas at UE 120 and the T antennas at Node B 110 may be characterized by a T×R MIMO channel matrix $H_{UL}(k)$ for each subcarrier k. $H_{UL}(k)$ may have the form shown in equation (6).

For FDD, the downlink MIMO channel matrix $H_{DL}(k)$ may not be correlated with the uplink MIMO channel matrix $H_{UL}(k)$. The Node B may estimate $H_{UL}(k)$ based on the sounding reference signal transmitted by the UE. The Node B may send precoding matrix indicator (PMI) information obtained from $H_{UL}(k)$ to the UE for precoding on the uplink. Similarly, the UE may estimate $H_{DL}(k)$ based on the cell-specific reference signal transmitted by the Node B. The UE may send PMI information obtained from $H_{DL}(k)$ to the Node B for precoding on the downlink.

For TDD, the downlink MIMO channel matrix $H_{DL}(k)$ may be correlated with the uplink MIMO channel matrix $H_{UL}(k)$ and may be assumed to be reciprocal of one another, so that $H_{UL}(k)=H_{DL}^T(k)$, where "$T$" denotes a transpose. In this case, the Node B may estimate $H_{UL}(k)$ based on the sounding reference signal transmitted by the UE. The Node B may estimate $H_{DL}(k)$ based on the estimated $H_{UL}(k)$ by assuming channel reciprocity. The Node B may then use $H_{DL}(k)$ to obtain PMI information for the downlink. Similarly, the UE may estimate $H_{DL}(k)$ based on the cell-specific reference signal transmitted by the Node B. The UE may estimate $H_{UL}(k)$ based on the estimated $H_{DL}(k)$ by assuming channel reciprocity. The UE may then use $H_{UL}(k)$ to obtain PMI information for the uplink.

An overall downlink MIMO channel is composed of the transmit chains for the T antennas at the Node B, the downlink MIMO channel, and the receive chains for the R antennas at the UE. An overall uplink MIMO channel is composed of the transmit chains for the R antennas at the UE, the uplink MIMO channel, and the receive chains for the T antennas at the Node B. For FDD, the overall downlink MIMO channel for each link may be estimated based on a reference signal received via that link. For TDD, the overall downlink MIMO channel may not be reciprocal of the overall uplink MIMO channel, even if $H_{UL}(k)=H_{DL}^T(k)$, due to differences between the responses of the transmit and receive chains at the Node B and the UE. Calibration may be performed to determine a calibration matrix that may be applied (e.g., at the Node B) to account for the differences between the responses of the transmit and receive chains at the Node B and the UE. Calibration may be performed as described in commonly assigned U.S. patent application Ser. No. 10/693,169, entitled "CHANNEL CALIBRATION FOR A TIME DIVISION DUPLEXED COMMUNICATION SYSTEM," filed Oct. 23, 2003. With the calibration matrix applied, the overall downlink MIMO channel may be assumed to be reciprocal of the overall uplink MIMO channel. For simplicity, the following description assumes that the transmit and receive chains have flat responses, the calculation matrix is an identity matrix I, the overall downlink MIMO channel matrix is $H_{DL}(k)$, the overall uplink MIMO channel matrix is $H_{UL}(k)$, and $H_{UL}(k)=H_{DL}^T(k)$ for TDD.

For both FDD and TDD, the Node B may transmit M symbol streams on M layers to the UE, where in general $1 \leq M \leq \min\{T, R\}$. The layers may be viewed as spatial channels of a MIMO channel. Similarly, the UE may transmit M symbol streams on M layers to the Node B. The number of symbol streams to send on the uplink may or may not be equal to the number of symbol streams to send on the downlink. For clarity, data transmission on the downlink is described below.

Good performance may be achieved by transmitting data on eigenmodes of a MIMO channel. The eigenmodes may be viewed as orthogonal spatial channels. To transmit data on eigenmodes, the Node B may obtain a precoding matrix based on ideal eigen-beamforming or pseudo eigen-beamforming and may then perform precoding with the precoding matrix. Table 2 summarizes the characteristics of ideal and pseudo eigen-beamforming.

TABLE 2

| Beamforming Type | Description |
| --- | --- |
| Ideal eigen-beamforming | Precoding matrix is derived based on a MIMO channel matrix. |
| Pseudo eigen-beamforming | Precoding matrix is derived based on a pseudo-beam matrix. |

For ideal eigen-beamforming, the downlink MIMO channel matrix $H_{DL}(k)$ may be diagonalized with singular value decomposition, as follows:

$$H_{DL}(k)=U(k)\Sigma(k)V^H(k), \quad \text{Eq (7)}$$

where U(k) is an R×R unitary matrix of left eigenvectors of $H_{DL}(k)$,

V(k) is a T×T unitary matrix of right eigenvectors of $H_{DL}(k)$, $\Sigma(k)$ is an R×T diagonal matrix of singular values of $H_{DL}(k)$, and "$H$" denotes a Hermitian or conjugate transpose.

A unitary matrix has columns that are orthogonal to one another, and each column has unit power. A diagonal matrix has possible non-zero values along the diagonal and zeros elsewhere. The singular values in $\Sigma(k)$ are indicative of the channel gains of the eigenmodes of $H_{DL}(k)$ obtained via singular value decomposition. Matrix V(k) may also be referred to as an eigen-beam matrix, a beamforming matrix, etc. The eigen-beam matrix V(k) may also be obtained by performing eigenvalue decomposition of a covariance matrix of $H_{DL}(k)$. The eigenvalue decomposition may be expressed as $H_{DL}^H(k) H_{DL}(k)=V(k)\Lambda(k)V^H(k)$, where $\Lambda(k)=\Sigma^H(k)\Sigma(k)$ and $\Lambda(k)$ is a diagonal matrix of eigenvalues of $H_{DL}(k)$.

The Node B may transmit data on M eigenmodes to the UE, where $1 \leq M \leq \min\{T, R\}$. The number of eigenmodes (M) to use for data transmission may also be referred to as the rank of the data transmission.

A precoding matrix $W_{IBF}(k)$ may be formed based on M columns of V(k) for the M eigenmodes. In one design, $W_{IBF}(k)$ may be formed as follows:

$$W_{IBF}(k) = [v_1(k), \ldots, v_M(k)], \quad \text{Eq (8)}$$

where $v_m(k)$ is the column of V(k) for the m-th selected eigenmode, for m=1, ..., M, and $W_{IBF}(k)$ is a T×M precoding matrix for ideal eigen-beamforming (IBF).

In another design, a codebook of precoding matrices may be supported. $W_{IBF}(k)$ may be formed based on a precoding matrix in the codebook that most closely matches V(k), e.g., have the closest distance to V(k).

The Node B may perform symbol scaling and precoding for ideal eigen-beamforming as follows:

$$x_{IBF}(k) = W_{IBF}(k)G(k)d(k), \quad \text{Eq (9)}$$

where d(k) is an M×1 vector of data symbols to send on subcarrier k,

G(k) is an M×M diagonal matrix of gains for the data symbols, and x(k) is a T×1 vector of output symbols for subcarrier k.

The UE may obtain received symbols from the R antennas, which may be expressed as:

$$\begin{aligned} r(k) &= H_{DL}(k)x_{IBF}(k) + n(k) \\ &= H_{DL}(k)W_{IBF}(k)G(k)d(k) + n(k) \\ &= H_{EDL}(k)d(k) + n(k) \end{aligned} \quad \text{Eq (10)}$$

where $H_{EDL}(k) = H_{DL}(k)W_{IBF}(k)G(k)$ is an R×M effective MIMO channel matrix for ideal eigen-beamforming, r(k) is an R×1 vector of received symbols for subcarrier k, and n(k) is an R×1 vector of noise and interference for subcarrier k.

The noise and interference may have a covariance matrix of $R_{nn}(k) = E\{n(k)n^H(k)\}$, where $E\{\}$ denotes an expectation. The noise and interference may be assumed to be additive white Gaussian noise (AWGN) with a zero mean vector and a covariance matrix of $R_{nn}(k) = \sigma_n^2 I$, where $\sigma_n^2$ is the variance of the noise and interference.

The UE may perform MIMO detection based on minimum mean square error (MMSE), zero-forcing equalization, MMSE with successive interference cancellation, or some other MIMO detection technique. For MMSE, the UE may derive an M×R detection matrix M(k) for each subcarrier k, as follows:

$$M(k) = D(k)[H_{EHL}^H(k)H_{EDL}(k) + R_{nn}(k)]^{-1}H_{EDL}^H(k), \quad \text{Eq (11)}$$

where $Z(k) = [H_{EDL}^H(k)H_{EDL}(k) + R_{nn}(k)]^{-1}H_{EDL}^H(k)H_{EDL}(k)$, and $D(k) = [\text{diag } Z(k)]^{-1}$ is a diagonal matrix of scaling values to obtain normalized symbol estimates.

The UE may perform MIMO detection as follows:

$$\hat{d}(k) = M(k)r(k), \quad \text{Eq (12)}$$

where $\hat{d}(k)$ is an M×1 vector of symbol estimates for subcarrier k. $\hat{d}(k)$ is an estimate of d(k) sent by the Node B.

A signal-to-and-noise-and-interference ratio (SINR) for each eigenmode may be expressed as:

$$SINR_m(k) = \frac{z_m(k)}{1 - z_m(k)}, \quad m = 1, \ldots, M, \quad \text{Eq (13)}$$

where $z_m(k)$ is the m-th diagonal element of Z(k), and $SINR_m(k)$ is the SINR of eigenmode m for subcarrier k.

In general, the SINR may be dependent on the MIMO detection technique used by the UE. Different MIMO detection techniques may be associated with different equations for computing SINR.

Rank prediction may be performed (e.g., by the UE) to determine M eigenmodes to use for data transmission. In one design of rank prediction, an overall throughput may be computed for each possible combination of eigenmodes that can be used for data transmission. For a given eigenmode combination or hypothesis, the available transmit power of $P_{avail}$ may be allocated to the M eigenmodes in that combination based on uniform power allocation, so that $P_m = P_{avail}/M$ and $P_m$ is the transmit power allocated to eigenmode m. The power allocation may also be based on water-filling or some other technique. The gain matrix G(k) may be computed based on the transmit power allocated to the M eigenmodes. The gain matrix G(k) may include a non-zero gain for each selected eigenmode and a zero gain for each unselected eigenmode. The effective MIMO channel matrix $H_{EDL}(k)$ may then be determined based on the MIMO channel matrix $H_{DL}(k)$, the precoding matrix $W_{IBF}(k)$, and the gain matrix G(k). The SINRs of the M eigenmodes may be determined based on the effective MIMO channel matrix $H_{EDL}(k)$ and the noise covariance matrix $R_{nn}(k)$, as described above. The overall throughput for the current hypothesis may then be determined based on the SINRs of the M eigenmodes.

The computation described above may be repeated for each possible combination of eigenmodes to obtain an overall throughput for that combination. The combination of eigenmodes with the highest overall throughput may be selected for data transmission. Rank prediction is described in commonly assigned U.S. patent application Ser. No. 11/449,893, entitled "ROBUST RANK PREDICTION FOR A MIMO SYSTEM," filed Jun. 9, 2006.

For downlink transmission, the UE may convert the SINR of each of the M eigenmodes to a CQI value based on a predetermined mapping. The UE may obtain CQI information for the M eigenmodes, which may comprise (i) a CQI value for each eigenmode or (ii) a base CQI for the first eigenmode and a delta CQI for the difference between the CQI values of successive eigenmodes. The UE may send the CQI information to the Node B. The Node B may select a modulation and coding scheme (MCS) for each eigenmode based on the CQI value for that eigenmode.

For pseudo eigen-beamforming, a pseudo-beam matrix may be formed for each subcarrier k, as follows:

$$B(k) = [h_{DL,1}(k), \ldots, h_{DL,R}(k), b_{R+1}(k), \ldots, b_T(k)], \quad \text{Eq (14)}$$

where $h_{DL,i}(k)$ is a T×1 channel vector for UE antenna i, $b_i(k)$ is a T×1 random vector, and B(k) is a T×T pseudo-beam matrix.

In general, B(k) may be formed with zero or more channel vectors in $H_{DL}(k)$ for zero or more UE antennas. Each channel vector $h_{DL,i}(k)$ may correspond to one row of $H_{DL}(k)$. The remaining columns of B(k) may be random vectors, which may be columns of a discrete Fourier transform (DFT) matrix, a Hadamard or Walsh matrix, or some other matrix.

QR decomposition of the pseudo-beam matrix B(k) may be performed as follows:

$$B(k) = Q(k)R(k), \quad \text{Eq (15)}$$

where Q(k) is a T×T orthonormal matrix containing T orthogonal vectors, and

R(k) is a T×T upper triangular matrix with zeros below the diagonal.

Q(k) may include a vector $$q_i(k) = \frac{h_{DL,i}(k)}{\|h_{DL,i}(k)\|}$$

for each channel vector used for B(k).

A preceding matrix $W_{PBF}(k)$ may be formed based on M columns of Q(k) for M eigenmodes. In one design, $W_{PBF}(k)$ may be formed as follows:

$$W_{PBF}(k)=[q_1(k),\ldots,q_M(k)], \quad \text{Eq (16)}$$

where $q_m(k)$ is the column of Q(k) for the m-th selected eigenmode, for m=1, ..., M, and $W_{PBF}(k)$ is a T×M preceding matrix for pseudo eigen-beamforming (PBF).

In another design, a codebook of preceding matrices may be supported. $W_{PBF}(k)$ may be formed based on a preceding matrix in the codebook that most closely matches Q(k).

The Node B may perform symbol scaling and preceding for pseudo eigen-beamforming as follows:

$$x_{PBF}(k)=W_{PBF}(k)G(k)d(k), \quad \text{Eq (17)}$$

where $X_{PBF}(k)$ is a T×1 vector of output symbols for subcarrier k.

The UE may obtain received symbols from the R antennas, which may be expressed as:

$$\begin{aligned} r(k) &= H_{DL}(k)x_{PBF}(k) + n(k) \\ &= H_{DL}(k)W_{PBF}(k)G(k)d(k) + n(k) \\ &= H_{EDL}(k)d(k) + n(k) \end{aligned} \quad \text{Eq (18)}$$

where $H_{EDL}(k)=H_{DL}(k)W_{PBF}(k)$ G(k) is an R×M effective MIMO channel matrix for pseudo eigen-beamforming.

The UE may perform MIMO detection based on MMSE. The UE may derive a detection matrix M(k) for each subcarrier k as shown in equation (11). The UE may then perform MIMO detection on the received symbols as shown in equation (12) to obtain symbol estimates.

Rank selection may be performed (e.g., by the UE) to select M eigenmodes to use for data transmission on the downlink. Rank prediction may be performed as described above, albeit with the preceding matrix $W_{PBF}(k)$ obtained based on Q(k) instead of V(k). The SINR of each eigenmode may be estimated as described above, albeit with the preceding matrix $W_{PBF}(k)$ instead of $W_{IBF}(k)$. The UE may obtain CQI information for the M eigenmodes based on the SINRs of the eigenmodes and may send the CQI information to the Node B. The Node B may select a modulation and coding scheme for each eigenmode based on the CQI value for that eigenmode.

Table 3 summarizes reference signals and feedback information sent by the Node B and the UE for MIMO transmission on the downlink for ideal eigen-beamforming and pseudo eigen-beamforming in both FDD and TDD systems. The Node B may transmit a cell-specific reference signal on the downlink. The UE may estimate the downlink MIMO channel based on the cell-specific reference signal. The UE may obtain a precoding matrix for either ideal or pseudo eigen-beamforming based on the downlink MIMO channel estimate. The UE may also perform rank prediction and determine the number of layers or symbol streams (M) to send and the CQI value of each layer based on the precoding matrix and other information. For FDD, the UE may send feedback information comprising CQI information and PMI information. The rank M may be (i) explicitly provided in the feedback information or (ii) implicitly provided by the dimension of the precoding matrix and/or by the number of CQI values sent by the UE. For TDD, the UE may send the same feedback information as for FDD. Alternatively, the UE may send a sounding reference signal, which may be used by the Node B to determine the precoding matrix.

TABLE 3

| FDD - Ideal eigen-beamforming | TDD - Ideal eigen-beamforming |
| --- | --- |
| Node B transmits cell-specific reference signal on downlink UE sends CQI, rank, and PMI | Node B transmits cell-specific reference signal on downlink UE sends CQI, rank, and sounding reference signal or PMI |
| FDD - Pseudo eigen-beamforming | TDD - Pseudo eigen-beamforming |
| Node B transmits cell-specific reference signal on downlink UE sends CQI, rank, and PMI | Node B transmits cell-specific reference signal on downlink UE sends CQI, rank, and sounding reference signal or PMI |

MIMO transmission on the uplink with ideal eigen-beamforming and pseudo eigen-beamforming in FDD and TDD systems may be performed in an analogous manner as MIMO transmission on the downlink. The UE may transmit a sounding reference signal, which may be used by the Node B to estimate the uplink MIMO channel. For FDD, the Node B may send feedback information comprising CQI and PMI information. For TDD, the Node B may send CQI information and either PMI information or a cell-specific reference signal.

FIG. 5 shows a design of a process 500 for sending data in a wireless communication system. Process 500 may be performed by a transmitter, which may be a Node B for data transmission on the downlink, a UE for data transmission on the uplink, or some other entity.

The transmitter may send a first reference signal via a first link to a receiver (block 512). The transmitter may receive CQI information determined by the receiver based on the first reference signal (block 514). The transmitter may also receive a second reference signal via a second link from the receiver (block 516). The transmitter may obtain at least one MIMO channel matrix H(k) for the first link based on the second reference signal received via the second link, by assuming channel reciprocity (block 518). The transmitter may determine at least one preceding matrix based on the at least one MIMO channel matrix (block 520). The transmitter may then send a data transmission to the receiver based on the at least one preceding matrix and the CQI information (block 522).

In one design of block 520, the transmitter may perform singular value decomposition of the at least one MIMO channel matrix H(k) to obtain at least one matrix V(k) of eigenvectors, e.g., as shown in equation (7). The transmitter may determine the at least one preceding matrix $W_{IBF}(k)$ based on the at least one matrix of eigenvectors, e.g., as shown in equation (8). In another design of block 520, the transmitter may form at least one pseudo-beam matrix B(k) based on the at least one MIMO channel matrix, e.g., as shown in equation (14). The transmitter may perform QR decomposition of the at least one pseudo-beam matrix to obtain at least one matrix Q(k) of orthogonal vectors, e.g., as shown in equation (15).

The transmitter may then determine the at least one precoding matrix $W_{PBF}(k)$ based on the at least one matrix of orthogonal vectors, e.g., as shown in equation (16).

In one design of block 522, the transmitter may perform coding and modulation for the data transmission based on the CQI information. The transmitter may perform precoding for the data transmission based on the at least one precoding matrix, e.g., as shown in equation (9) or (17).

FIG. 6 shows a design of an apparatus 600 for sending data in a wireless communication system. Apparatus 600 includes a module 612 to send a first reference signal via a first link to a receiver, a module 614 to receive CQI information determined by the receiver based on the first reference signal, a module 616 to receive a second reference signal via a second link from the receiver, a module 618 to obtain at least one MIMO channel matrix for the first link based on the second reference signal received via the second link, a module 620 to determine at least one precoding matrix based on the at least one MIMO channel matrix, and a module 622 to send a data transmission to the receiver based on the at least one precoding matrix and the CQI information.

FIG. 7 shows a design of a process 700 for receiving data in a wireless communication system. Process 700 may be performed by a receiver, which may be a UE for data transmission on the downlink, a Node B for data transmission on the uplink, or some other entity.

The receiver may receive a first reference signal via a first link from a transmitter (block 712). The receiver may determine CQI information based on the first reference signal (block 714) and may send the CQI information to the transmitter (block 716). The receiver may also send a second reference signal via a second link (block 718). The receiver may receive a data transmission sent by the transmitter based on the CQI information and at least one precoding matrix, which may be determined by the transmitter based on the second reference signal (block 720). The receiver may obtain at least one MIMO channel matrix H(k) for the first link based on the first reference signal (block 722). The receiver may determine at least one detection matrix M(k) based on the at least one MIMO channel matrix, e.g., as shown in equation (11) (block 724). The receiver may perform MIMO detection for the received data transmission based on the at least one detection matrix, e.g., as shown in equation (12) (block 726).

In one design, the receiver may perform singular value decomposition of the at least one MIMO channel matrix H(k) to obtain at least one matrix V(k) of eigenvectors. The receiver may determine at least one precoding matrix $W_{IBF}(k)$ based on the at least one matrix of eigenvectors. In another design, the receiver may form at least one pseudo-beam matrix B(k) based on the at least one MIMO channel matrix. The receiver may perform QR decomposition of the at least one pseudo-beam matrix to obtain at least one matrix Q(k) of orthogonal vectors. The receiver may then determine at least one precoding matrix $W_{PBF}(k)$ based on the at least one matrix of orthogonal vectors. For both designs, the receiver may determine the at least one detection matrix M(k) based further on the at least one precoding matrix. The receiver may also determine the CQI information based on the at least one precoding matrix.

FIGS. 5 and 7 may be used for data transmission on the downlink or uplink. For data transmission on the downlink, the first reference signal may be a cell-specific reference signal sent on the downlink, and the second reference signal may be a sounding reference signal sent on the uplink. The CQI information may be sent in at least one SC-FDMA symbol on the uplink. At least one OFDMA symbol may be sent on the downlink for the data transmission. For data transmission on the uplink, the first reference signal may be a sounding reference signal sent on the uplink, and the second reference signal may be a cell-specific reference signal sent on the downlink. The CQI information may be sent in at least one OFDMA symbol on the downlink. At least one SC-FDMA symbol may be sent on the uplink for the data transmission. The CQI information may also be referred to as MCS information, transport format information, packet format information, rate information, feedback information, etc.

For data transmission on the downlink or uplink, one of the reference signals (e.g., the cell-specific reference signal) may be generated based on a pseudo-random sequence, e.g., as shown in equation (1). The other reference signal (e.g., the sounding reference signal) may be generated based on a CAZAC sequence, e.g., as shown in equation (2) or (4). The reference signals may also be generated in other manners. The first reference signal may be sent on subcarriers separated by a first spacing. The second reference signal may be sent on subcarriers separated by a second spacing different from the first spacing, e.g., as shown in FIGS. 3A and 3B.

FIG. 8 shows a design of an apparatus 800 for receiving data in a wireless communication system. Apparatus 800 includes a module 812 to receive a first reference signal via a first link from a transmitter, a module 814 to determine CQI information based on the first reference signal, a module 816 to send the CQI information to the transmitter, a module 818 to send a second reference signal via a second link, a module 820 to receive a data transmission from the transmitter, with the data transmission being sent based on the CQI information and at least one precoding matrix determined by the transmitter based on the second reference signal, a module 822 to obtain at least one MIMO channel matrix for the first link based on the first reference signal, a module 824 to determine at least one detection matrix based on the at least one MIMO channel matrix, and a module 826 to perform MIMO detection for the received data transmission based on the at least one detection matrix.

The modules in FIGS. 6 and 8 may comprise processors, electronics devices, hardware devices, electronics components, logical circuits, memories, etc., or any combination thereof.

The eigen-beamforming techniques described herein may provide certain advantages. First, the eigen-beamforming may provide higher SINR, which may result in higher peak data rate, better coverage, etc. Second, the techniques may reduce the amount of feedback sent by the receiver to the transmitter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting data in a wireless communication system, comprising:
    sending a first reference signal via a first link to a receiver;
    receiving channel quality indicator (CQI) information determined by the receiver based on the first reference signal;
    receiving a second reference signal via a second link from the receiver;
    obtaining at least one multiple-input multiple-output (MIMO) channel matrix for the first link based on the second reference signal received via the second link;
    determining at least one precoding matrix based on the at least one MIMO channel matrix; and
    sending a data transmission to the receiver based on the at least one precoding matrix and the CQI information,
    wherein the determining the at least one precoding matrix comprises:
        forming at least one pseudo-beam matrix based on the at least one MIMO channel matrix;
        performing QR decomposition of the at least one pseudo-beam matrix to obtain at least one matrix of orthogonal vectors; and
        determining the at least one precoding matrix based on the at least one matrix of orthogonal vectors.

2. The method of claim 1, wherein the sending the data transmission comprises
    performing coding and modulation for the data transmission based on the CQI information, and
    performing precoding for the data transmission based on the at least one precoding matrix.

3. The method of claim 1, wherein the sending the first reference signal via the first link comprises sending a cell-specific reference signal via downlink, and wherein the receiving the second reference signal via the second link comprises receiving a sounding reference signal via uplink.

4. The method of claim 1, wherein the sending the first reference signal via the first link comprises sending a sounding reference signal via uplink, and wherein the receiving the second reference signal via the second link comprises receiving a cell-specific reference signal via downlink.

5. A method of transmitting data in a wireless communication system, comprising:
    sending a first reference signal via a first link to a receiver;
    receiving channel quality indicator (CQI) information determined by the receiver based on the first reference signal;
    receiving a second reference signal via a second link from the receiver;
    obtaining at least one multiple-input multiple-output (MIMO) channel matrix for the first link based on the second reference signal received via the second link;
    determining at least one precoding matrix based on the at least one MIMO channel matrix; and
    sending a data transmission to the receiver based on the at least one precoding matrix and the CQI information, wherein one of the first and second reference signals is generated based on a pseudo-random sequence, and wherein the other one of the first and second reference signals is generated based on a constant amplitude zero auto correlation (CAZAC) sequence.

6. A method of transmitting data in a wireless communication system, comprising:
sending a first reference signal via a first link to a receiver;
receiving channel quality indicator (CQI) information determined by the receiver based on the first reference signal;
receiving a second reference signal via a second link from the receiver;
obtaining at least one multiple-input multiple-output (MIMO) channel matrix for the first link based on the second reference signal received via the second link;
determining at least one precoding matrix based on the at least one MIMO channel matrix; and
sending a data transmission to the receiver based on the at least one precoding matrix and the CQI information,
wherein the sending the first reference signal comprises sending the first reference signal on subcarriers separated by a first spacing, and wherein the receiving the second reference signal comprises receiving the second reference signal on subcarriers separated by a second spacing different from the first spacing.

7. The method of claim 1, wherein the receiving the CQI information comprises receiving at least one Single-Carrier Orthogonal Frequency Division Multiple Access (SC-FDMA) symbol comprising the CQI information, and wherein the sending the data transmission comprises sending at least one Orthogonal Frequency Division Multiple Access (OFDMA) symbol for the data transmission.

8. The method of claim 1, wherein the receiving the CQI information comprises receiving at least one Orthogonal Frequency Division Multiple Access (OFDMA) symbol comprising the CQI information, and wherein the sending the data transmission comprises sending at least one Single-Carrier Orthogonal Frequency Division Multiple Access (SC-FDMA) symbol for the data transmission.

9. An apparatus for wireless communication, comprising:
at least one processor configured to send a first reference signal via a first link to a receiver, to receive channel quality indicator (CQI) information determined by the receiver based on the first reference signal, to receive a second reference signal via a second link from the receiver, to obtain at least one multiple-input multiple-output (MIMO) channel matrix for the first link based on the second reference signal received via the second link, to determine at least one precoding matrix based on the at least one MIMO channel matrix, and to send a data transmission to the receiver based on the at least one precoding matrix and the CQI information,
wherein the at least one processor is configured to form at least one pseudo-beam matrix based on the at least one MIMO channel matrix, to perform QR decomposition of the at least one pseudo-beam matrix to obtain at least one matrix of orthogonal vectors, and to determine the at least one precoding matrix based on the at least one matrix of orthogonal vectors.

10. The apparatus of claim 9, wherein one of the first and second reference signals comprises a cell-specific reference signal sent by a Node B, and wherein the other one of the first and second reference signals comprises a sounding reference signal sent by a user equipment (UE).

11. An apparatus for wireless communication, comprising:
means for sending a first reference signal via a first link to a receiver;
means for receiving channel quality indicator (CQI) information determined by the receiver based on the first reference signal;
means for receiving a second reference signal via a second link from the receiver;
means for obtaining at least one multiple-input multiple-output (MIMO) channel matrix for the first link based on the second reference signal received via the second link;
means for determining at least one precoding matrix based on the at least one MIMO channel matrix; and
means for sending a data transmission to the receiver based on the at least one precoding matrix and the CQI information,
wherein the means for determining the at least one precoding matrix comprises:
means for forming at least one pseudo-beam matrix based on the at least one MIMO channel matrix;
means for performing QR decomposition of the at least one pseudo-beam matrix to obtain at least one matrix of orthogonal vectors; and
means for determining the at least one precoding matrix based on the at least one matrix of orthogonal vectors.

12. The apparatus of claim 11, wherein one of the first and second reference signals comprises a cell-specific reference signal sent by a Node B, and wherein the other one of the first and second reference signals comprises a sounding reference signal sent by a user equipment (UE).

13. A computer program product, comprising:
a non-transitory computer-readable medium comprising:
code for causing at least one computer to send a first reference signal via a first link to a receiver,
code for causing the at least one computer to receive channel quality indicator (CQI) information determined by the receiver based on the first reference signal,
code for causing the at least one computer to receive a second reference signal via a second link from the receiver,
code for causing the at least one computer to obtain at least one multiple-input multiple-output (MIMO) channel matrix for the first link based on the second reference signal received via the second link,
code for causing the at least one computer to determine at least one precoding matrix based on the at least one MIMO channel matrix, and
code for causing the at least one computer to send a data transmission to the receiver based on the at least one precoding matrix and the CQI information,
wherein the code for causing the at least one computer to determine the at least one precoding matrix comprises:
code for causing the computer to form at least one pseudo-beam matrix based on the at least one MIMO channel matrix;
code for causing the computer to perform QR decomposition of the at least one pseudo-beam matrix to obtain at least one matrix of orthogonal vectors; and
code for causing the computer to determine the at least one precoding matrix based on the at least one matrix of orthogonal vectors.

14. A method of receiving data in a wireless communication system, comprising:
receiving a first reference signal via a first link from a transmitter;
determining channel quality indicator (CQI) information based on the first reference signal;

sending the CQI information to the transmitter;
sending a second reference signal via a second link; and
receiving a data transmission sent by the transmitter based on the CQI information and at least one precoding matrix determined by the transmitter based on the second reference signal;
obtaining at least one multiple-input multiple-output (MIMO) channel matrix based on the first reference signal;
forming at least one pseudo-beam matrix based on the at least one MIMO channel matrix;
performing QR decomposition of the at least one pseudo-beam matrix to obtain at least one matrix of orthogonal vectors; and
determining at least one precoding matrix based on the at least one matrix of orthogonal vectors, and wherein the determining the CQI information comprises determining the CQI information based on the at least one precoding matrix.

15. The method of claim 14, further comprising:
determining at least one detection matrix based on the at least one MIMO channel matrix; and
performing MIMO detection for the received data transmission based on the at least one detection matrix.

16. The method of claim 14, wherein one of the first and second reference signals comprises a cell-specific reference signal sent by a Node B, and wherein the other one of the first and second reference signals comprises a sounding reference signal sent by a user equipment (UE).

17. A method of receiving data in a wireless communication system, comprising:
receiving a first reference signal via a first link from a transmitter;
determining channel quality indicator (CQI) information based on the first reference signal;
sending the CQI information to the transmitter;
sending a second reference signal via a second link; and
receiving a data transmission sent by the transmitter based on the CQI information and at least one precoding matrix determined by the transmitter based on the second reference signal,
wherein one of the first and second reference signals is generated based on a pseudo-random sequence, and wherein the other one of the first and second reference signals is generated based on a constant amplitude zero auto correlation (CAZAC) sequence.

18. The method of claim 14, wherein the sending the CQI information comprises sending at least one Single-Carrier Orthogonal Frequency Division Multiple Access (SC-FDMA) symbol comprising the CQI information, and wherein the receiving the data transmission comprises receiving at least one Orthogonal Frequency Division Multiple Access (OFDMA) symbol for the data transmission.

19. An apparatus for wireless communication, comprising:
at least one processor configured to receive a first reference signal via a first link from a transmitter, to determine channel quality indicator (CQI) information based on the first reference signal, to send the CQI information to the transmitter, to send a second reference signal via a second link, and to receive a data transmission sent by the transmitter based on the CQI information and at least one precoding matrix determined by the transmitter based on the second reference signal;
wherein the at least one processor is configured to obtain at least one multiple-input multiple-output (MIMO) channel matrix based on the first reference signal, to form at least one pseudo-beam matrix based on the at least one MIMO channel matrix, to perform QR decomposition of the at least one pseudo-beam matrix to obtain at least one matrix of orthogonal vectors, to determine at least one precoding matrix based on the at least one matrix of orthogonal vectors, and to determine the CQI information based on the at least one precoding matrix.

20. The apparatus of claim 19, wherein one of the first and second reference signals comprises a cell-specific reference signal sent by a Node B, and wherein the other one of the first and second reference signals comprises a sounding reference signal sent by a user equipment (UE).

21. The method of claim 5, wherein the determining the at least one precoding matrix comprises:
performing singular value decomposition of the at least one MIMO channel matrix to obtain at least one matrix of eigenvectors, and
determining the at least one precoding matrix based on the at least one matrix of eigenvectors.

22. The method of claim 6, wherein the determining the at least one precoding matrix comprises:
performing singular value decomposition of the at least one MIMO channel matrix to obtain at least one matrix of eigenvectors, and
determining the at least one precoding matrix based on the at least one matrix of eigenvectors.

* * * * *